United States Patent
Söderqvist et al.

[11] Patent Number: 5,940,976
[45] Date of Patent: Aug. 24, 1999

[54] APPARATUS FOR USE IN AN ENGINE-DRIVEN MACHINE

[75] Inventors: Magnus Söderqvist, Mölndal; Per Skogum, Göteborg; Tore Claesson, Örby, all of Sweden

[73] Assignee: Aktiebolaget Electrolux (publ.), Sweden

[21] Appl. No.: 08/851,663

[22] Filed: May 6, 1997

[30] Foreign Application Priority Data

May 13, 1996 [SE] Sweden ................................. 9601847

[51] Int. Cl.⁶ .......................... B23D 45/16; B23Q 11/06; B27G 19/02
[52] U.S. Cl. ................................. 30/390; 451/451; 30/388
[58] Field of Search ........................... 30/390, 391, 388; 83/678; 451/451

[56] References Cited

U.S. PATENT DOCUMENTS

| | | | |
|---|---|---|---|
| 4,848,001 | 7/1989 | Clark et al. | 30/391 |
| 5,140,754 | 8/1992 | Martenson | 30/390 |
| 5,384,985 | 1/1995 | Jacobsson | 451/451 |
| 5,386,667 | 2/1995 | Hausslein et al. | 451/451 |

FOREIGN PATENT DOCUMENTS

| | | |
|---|---|---|
| 0 126 641 | 11/1984 | European Pat. Off. . |
| 0 599 090 A1 | 6/1994 | European Pat. Off. . |
| 460 657 | 11/1989 | Sweden . |
| WO 92/19423 | 11/1992 | WIPO . |

*Primary Examiner*—Hwei-Siu Payer
*Attorney, Agent, or Firm*—Michael D. Bednarek; Crowell & Moring LLP

[57] ABSTRACT

The invention relates to an apparatus in an engine-driven machine having a tool carrier for a rotary tool and having a splinter shield cover (20) for the tool, which cover houses a section of the tool and has a through-running fixture hole (27) for the cover in a bearing side wall. What distinguishes the invention is that the apparatus comprises clamping devices (79) on the inside of the side wall, that the side wall of the cover is clamped between the clamping devices and the tool carrier (5), and that the first and second locking devices (79, 78) are arranged on the one side of the side wall up to the fixture hole, which locking devices, in mutual interaction and under the influence of the clamping force, prevent the cover from rotating about the center of rotation (31) of the tool, due to normally occurring stresses whilst the machine is in use, when the side walls of the cover are clamped between the clamping devices and the tool carrier, but which allow rotation of the cover with manual force applied to the cover for graduated, indexed adjustment of the cover into desired, indexed rotational positions relative to the tool carrier, the clamping force being herein surmounted.

19 Claims, 8 Drawing Sheets

APPARATUS FOR USE IN AN ENGINE-DRIVEN MACHINE

TECHNICAL FIELD

The invention relates to an apparatus in an engine-driven machine having a tool carrier for a rotary tool and having a splinter shield cover (blade guard) for the tool, which cover houses a section of the tool and has a through-running fixture hole for the cover in a bearing side wall.

TECHNICAL ASPECT

For the splinter shield cover to function optimally, the rear part of the splinter shield cover should lie close to the workpiece. Grinding particles and sparks are in this case collected by the shield and led away from the operator. To enable the splinter shield cover, in various situations, to lie close to the workpiece, it is necessary for the cover to be adjustable by rotation about the centre of rotation of the tool. In cutting machines, for example, it is customary for the splinter shield cover to be clamped in the desired position during operation. Whenever it is desired to adjust the cover into a new position, the cover is loosened by means of a lever, rotated into the desired position and re-secured in the new position by means of the lever. An advantage of this system is that the cover is securely locked down in its position during operation, but readjustment to a new position is relatively awkward, which is a drawback. Moreover, the arrangement is relatively complicated in terms of its design and adds in no small measure to the cost of the splinter shield. It is also known to secure the splinter shield cover by friction locking, which is released when the cover is to be rotated into a new adjustment position. The splinter shield which currently exists and which utilizes this principle does however have a number of drawbacks. Inter alia, it sometimes happens that the cover does not maintain its set position but rotates undesirably due to vibrations, jolts and other normally occurring stresses whilst the machine is in use, something which the user, for obvious reasons, finds bothersome. Moreover, the force which has to be applied in a desired readjustment is, of necessity, uncomfortably large, when friction locking is used.

BRIEF DISCLOSURE OF THE INVENTION

The object of the invention is to provide an apparatus of the kind specified in the introduction, which allows secure locking of the splinter shield cover in set positions, yet at the same time enables the cover to be rotated into a new desired position with a single movement. The invention also aims to provide a splinter shield cover which is designed in such a way that jolts and vibrations are minimized and hence also the cover's tendency, under the influence of jolts and vibrations, undesirably to rotate "of its own accord" whilst the machine is in use.

These and other aims can be achieved or made possible by virtue of the invention being characterized by what is stated in the characterizing clause of claim 1 to follow. Further characteristics and aspects and advantages of the invention derive from the dependent claims and from the description of a preferred embodiment.

BRIEF DESCRIPTION OF THE DRAWINGS

The invention will be described in greater detail below with reference to the drawings, of which.

DESCRIPTION OF A PREFERRED EMBODIMENT

Figure 1:
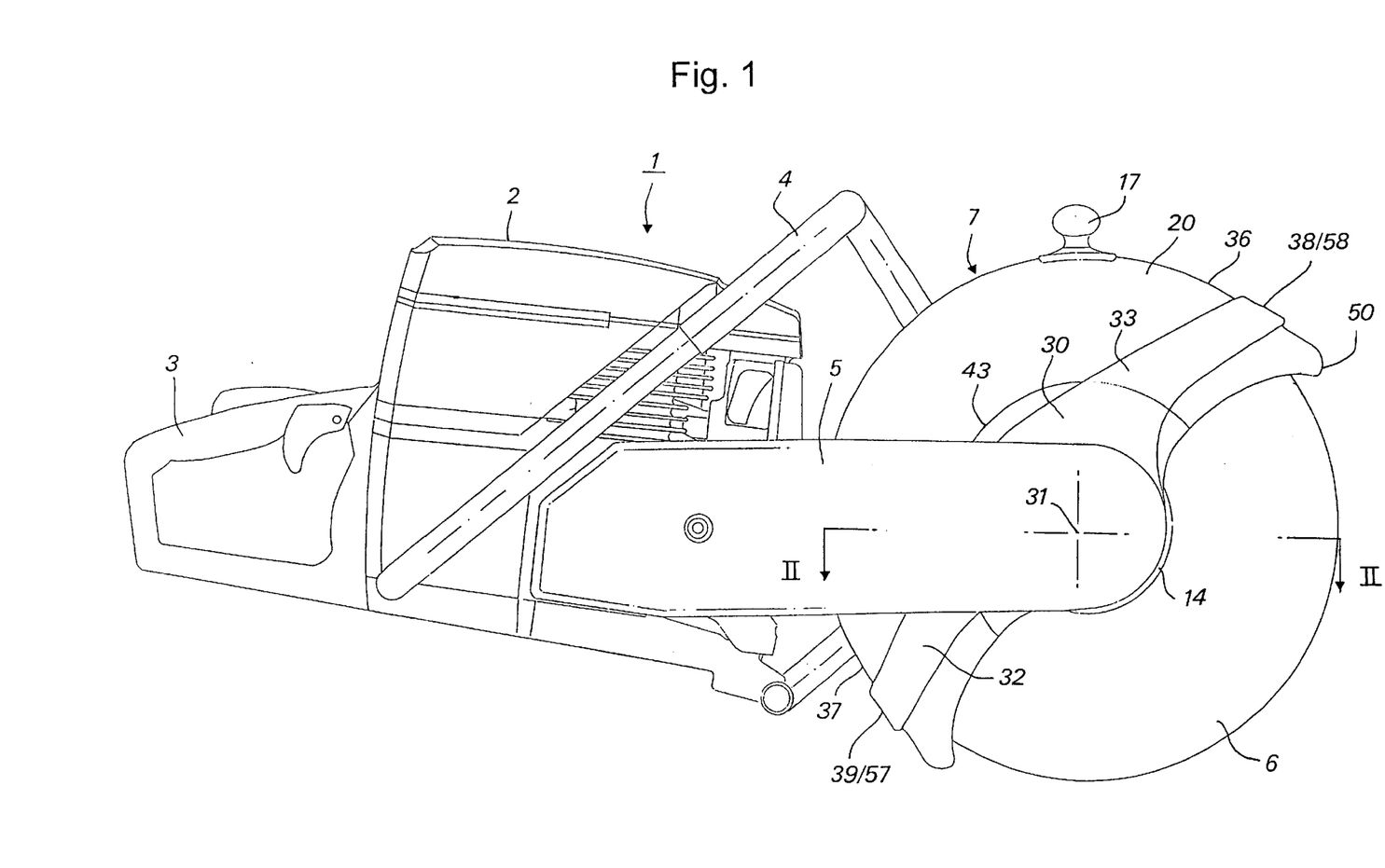
FIG. 1 represents a side view of a cutting machine having a splinter shield according to the invention.

With reference firstly to FIG. 1, a portable, manually operated, combustion-engine-driven working machine, more accurately a cutting machine, is denoted throughout by the numeral 1. Its main parts are constituted by a drive unit 2, a rear handle 3, a front handle 4, a tool carrier 5 (hereinafter referred to as a cutting arm), a cutting wheel 6 and a splinter shield 7. The cutting wheel 6 is driven via a drive belt 8, FIG. 2, which extends in the cutting arm 5 from the drive unit 2 to a front belt disc 9 having an axle 10 which is rotatable in a bearing 11 in a bearing housing 12, which is integrated with the cutting arm 5. The cutting wheel 6 is placed between a pair of flanged washers 13, 14 and clamped on the axle 10 by means of a nut 15.

The above belongs to the prior art. The innovatory aspect of the invention lies in the design of the splinter shield, which is denoted throughout by 7 and which comprises a protective cover 20. Also new is the way in which the protective cover 20 is fastened on the cutting arm 5, including the design of the fixture devices and rotational-adjustment and rotation-locking devices, which can be said to represent part of the integrated splinter shield 7.

Figure 5:
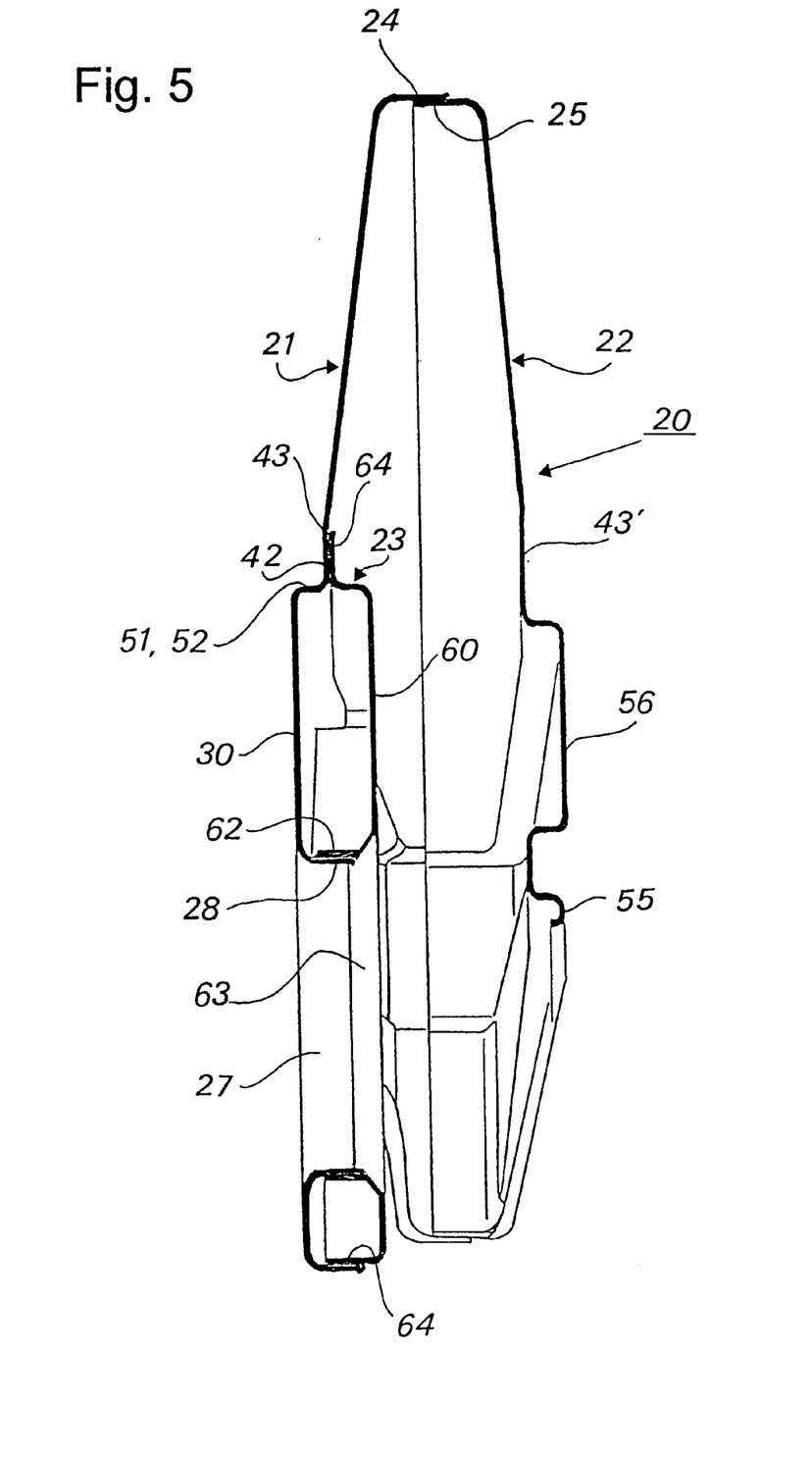
FIG. 5 shows the cover in cross-section along a view V—V in FIG. 3.

The protective cover 20 consists of a relatively flat cover, which in axial views has the principal shape of a semicircle, sector of a circle or crescent and which is intended to house a section of the cutting wheel 6. It comprises a first, bearing cover half 21, which faces the cutting arm 5, and a second cover half 22 and a reinforcing plate 23. On the cover there is a handle 17, expediently made from plastic, which is used whenever it is wished to rotate the cover about the centre line 31 of the axle into a different angular position relative to the cutting arm 5. The cover halves 21 and 22 and the reinforcing plate 23 consist, according to the embodiment, of 1 mm thick, form-pressed sheet steel. The two cover halves 21 and 22 have respective fold-over flanges 24 and 25 along their peripheral margin, arranged such that the bearing cover half 21 overlaps with its fold-over flange 24 the corresponding fold-over flange 25 outside the fold-over flange 25, in a manner which is known per se, FIGS. 2 and 5. The overlapping sections of the fold-over flanges 24, 25 are joined together by welding.

In the bearing cover half 21, there is a fixture hole 27, which is defined by a first, circular-cylindrical fold-in flange 28. The fixture hole 27 is formed in a pressed-out part of the bearing cover half 21. The pressed-out part comprises a plane wall section 30, which surrounds the fixture hole 27 and the plane of which is perpendicular to the centre line 31 of the fixture hole 27 and the axle 10 (which centre line simultaneously constitutes the centre of rotation of the cutting wheel 6) and a pair of plane, ridge-forming sections 32, 33, which extend from lines of curvature 34, 35 forward to and past the respective front 36 and rear edge 37 of the cover, so as then to be closed off by a front and a rear fold-over section 38, 39, which form projections on the respective front 36 and rear edge 37 of the cover. Also a section 40 in front of and below the elevated plane section 30, a section 41 behind and below the elevated plane section 30, and a section 42 above the elevated plane section 30, which sections 40, 41 and 42 are delimited by a circular arc 43, which coincides with the lines of curvature 34, 35, are level and parallel with the elevated plane section 30. Outside the circular arc 43, the wall of the cover half 21 slopes inward in the direction of the periphery. The second cover half 22, which will be described in greater detail below, has a correspondingly tapered shape, so that the cover 20 outside the said circular arc 43 exhibits in cross-section a tapered wedge shape, FIGS. 2 and 5.

The plane elevated section 30 of the bearing cover half 21 comprises a relatively narrow section 45 below the fixture hole 27. The section 45 is delimited in its periphery by a fold-in flange 46, which extends along a circular arc between the points 47 and 48. From the point 47, the fold-in flange 46 continues in the form of an inner fold-in edge 49 onward to the front tip 50 of the cover half and in the form of a ridge slope 44 between the plane elevated section 30 and the plane wall section 41, which continues up to and including the projecting section 38. The rear part of the cover half is symmetrically designed in the same way. At the top, the plane elevated section 30 is delimited by a ridge slope 51, which extends from a crest 52 respectively forward and backward towards, and encompassing, the respective projecting sections 38 and 39.

The second cover half 22 has outside the circular-ring arc 43' (which coincides with the circular-ring arc 43) a shape which essentially corresponds to the shape belonging to the first cover half 21. At a distance from the lower edge section 55 of the cover half 21, which is bent over outwards and inwards, there extends an elevation in the form of a wide ridge 56, the summit of which in cross-section is totally straight and, inside the circular arc 43', level and parallel with the plane section 30 on the first cover half 21, over the whole of the cover half 22 up to and past the respective front and rear edges 36, 37 of the cover, so as to form there respective projections 57 and 58. The latter are designed such that they too, in the fitted cover 20, are inserted in the projections 38, 39 of the first cover half 21 in the same way as the fold-in flange 25 is inserted in the fold-in flange 24 of the first cover half. In the fitted cover, the ridge 56 will in this way, via the projections 57 and 58, pass into corresponding projections 38, 39 on the first cover half 21 and thereafter continue with the ridge-forming sections 32 and 33 and finally join up with the plane elevated section 30. Together, the ridge 56, the projecting sections 38/58, 39/57, the ridge sections 32 and 33, as well as the plane elevated section 30 thus form a continuous elevation, which extends around the entire cover 20, i.e. including over the front 36 and rear edge 37 of the cover.

Figures 6, 7:
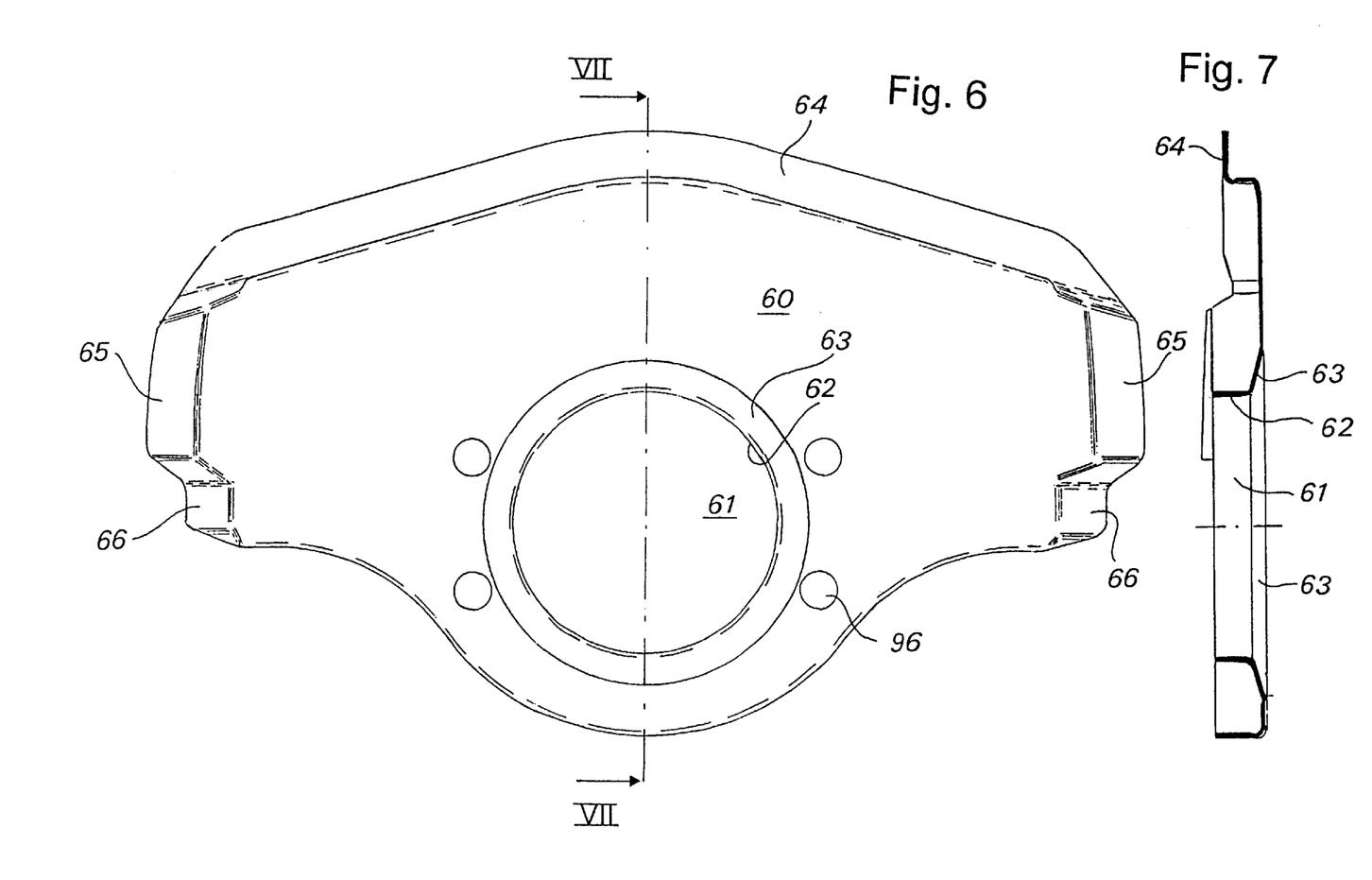
FIG. 6 represents a side view of a reinforcing plate which forms part of the cover and forms the one wall in a box construction forming part of the cover.
FIG. 7 shows the reinforcing plate in cross-section along a view VII—VII in FIG. 6.

The reinforcing plate 23, FIGS. 6 and 7, has a plane main part 60. A hole 61 is defined by a second circular-cylindrical fixture flange 62. When the reinforcing plate 23 is fitted in the cover 20 inside the bearing first cover half 21, the said second circular fold-in flange 62 bears against the outside of the first circular fold-in flange 28. Between the plane main part 60 of the reinforcing plate and the cylindrical fold-in flange 62 there is a circumferential conical section 63. The plane section 60 is surrounded by a lower fold-in flange 64 inside and along the lower fold-in flange 46 of the first cover half 21 and its continuation in the form of the front ridge slope 44 and corresponding rear ridge slope, respectively. In the upward direction, the plane section 60 is delimited by an inward-facing elongated lip 64, which bears against and is welded to the plane section 42 of the cover half 21 above the elevation 30. In front and behind, the plane section 60 is delimited by lip sections 65 and 66 which are folded-in to different depths. The lip sections 65 are thus folded-in to a greater depth and are inserted in the slots which are formed on the inside of the cover half 21 in the regions for the elevated sections 32 and 33. The lip sections 65 are welded to the inside of the cover half 21 against the inside facing the said elevations 32 and 33. Correspondingly, the shorter lip sections 66 bear against and are welded against the inside of the cover 21 between the ridge sections 32, 33 and the lower edge of the cover 21. There is thereby formed around the fixture hole 21 a closed chamber 70, which extends around the fixture hole 27. The height H of the chamber 70 in the axial direction amounts, according to the embodiment, to approx. 15 mm, i.e. to more than 10 times the thickness of each wall or more than 5 times the combined thickness of the walls. The closed body which forms the chamber 70 can also be defined as a hollow-beam construction, more specifically as an annular hollow-beam construction, having plane walls 30, 60 around the cylindrical, substantially double-walled fixture hole 27. The construction can also be described such that the cover 20 is double-walled in a region around the fixture hole 27, with the two walls (which are formed by the plane wall sections 36, 60 on the cover half 21 and on the reinforcing plate 23, respectively) arranged at a distance H apart.

When welding together the protective cover 20, the reinforcing plate 23 is first fitted on the inside of the first cover half 21 and welded firmly in place to form the said circumferential hollow-beam construction with the said circumferential chamber 70 having plane parallel walls 30, 60. Thereafter, the cover half 22 is fitted in the bearing cover half 21 and welded to this in the region for the fold-in flanges 24, 25 and also in the region for the overlapping projections 38/58 and 39/57. After finishing, the handle 17 is screwed tight.

Figure 9:
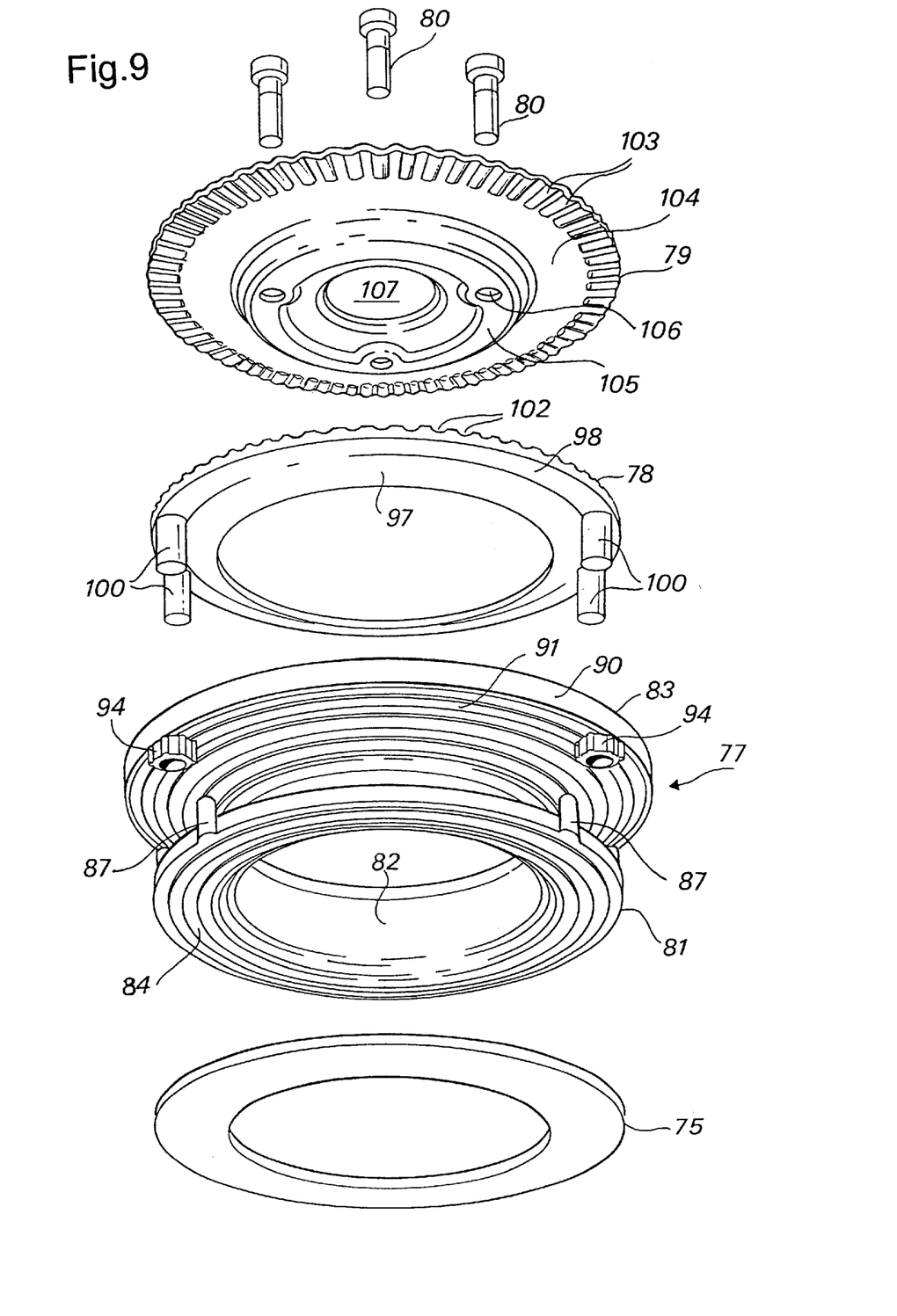
FIG. 9 represents an exploded view of the said fixture devices and combined rotational-adjustment and rotation-locking devices.

The height H of the chamber 70, which can also be expressed as the thickness of the circumferential box girder construction or as the distance between the walls 30, 60, in the double-walled section within the region for the fixture of the protective cover 20, and the diameter of the fixture hole 27 are chosen such that they harmonize with the dimensions of the bearing housing 12 on the cutting arm 5 and with the fixture devices and rotational-adjustment and rotation-locking devices, as will be described below. The bearing housing 12 has a cylindrical section 72, which extends up from a flanged section 73 for a stretch approximately corresponding to the height H of the chamber 70 plus the thickness of the walls 30 and 60. In the flanged section 73 there is an annular slot 74, in which a plane plastic washer 75 is housed, see also FIG. 9. The cylindrical section 72 of the bearing housing has an outer diameter which is somewhat smaller than the diameter of the fixture hole 27, so that a gap 76 is formed between the cylindrical bearing housing section 72 and the said first circular fold-in flange 28, FIG.

Figure 3:
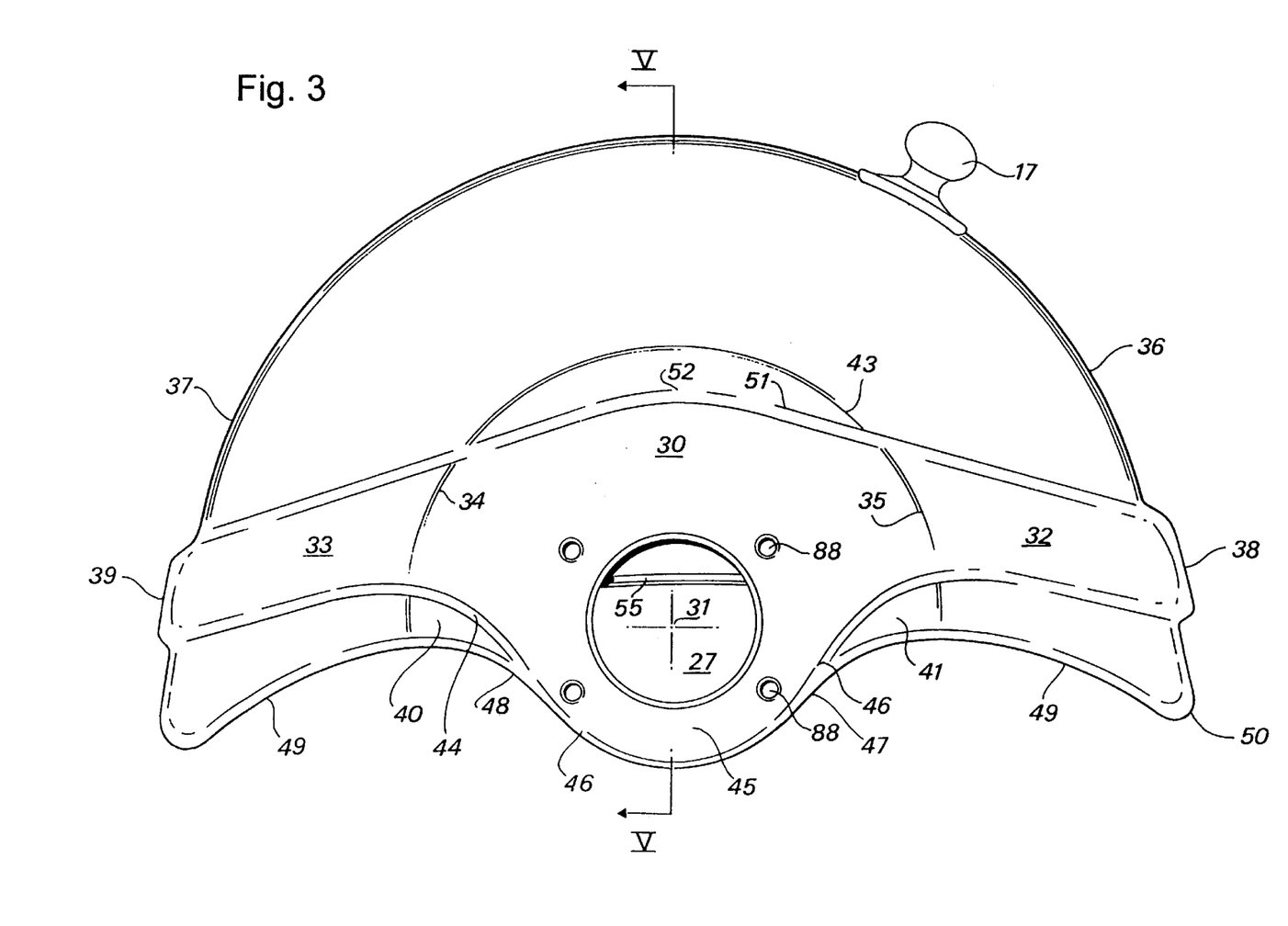
FIG. 3 shows that side of the splinter shield cover shown in FIG. 1 which faces the tool carrier of the machine, i.e. in the same view as in FIG. 1.
Figure 4:
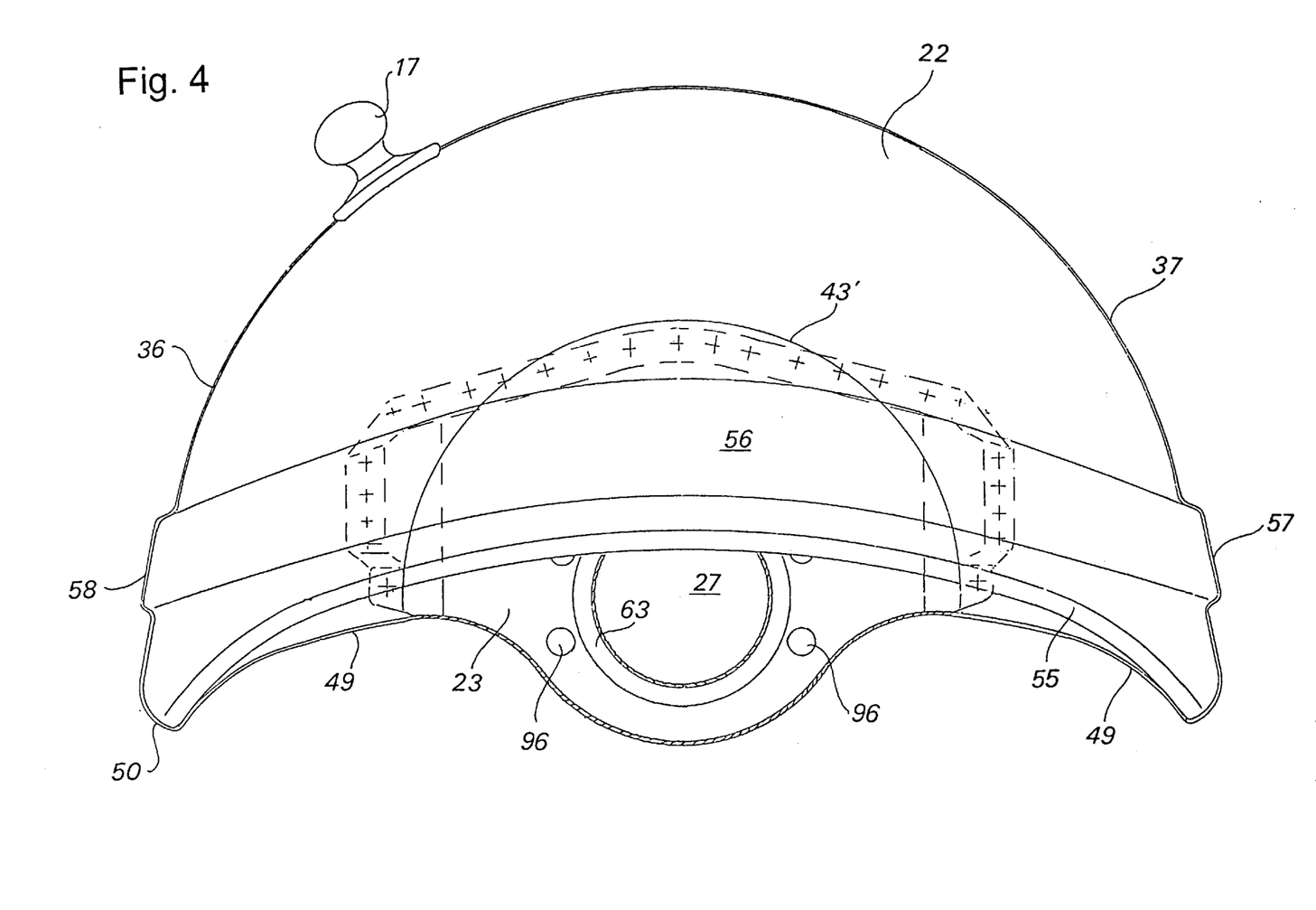
FIG. 4 shows the opposite, left side of the cover.

2. The fixture devices additionally comprise a rubber sleeve 77, an inner locking washer 78 made from plastic, an outer locking washer 79 made from pressed sheet steel and fastening screws 80. The rubber sleeve 77 comprises an inner, outward-facing collar 81, a cylindrical section 82 and an outer, outward-facing collar 83. The inner collar 81 has on both sides annular slots 84, 85, arranged alternately, so that the outer slots 85 are arranged midway between the inner slots 84 and vice versa. In addition, the inner collar 81 is provided in its periphery with four upwardly directed protuberances 87, which are placed such that they can be introduced into corresponding holes 88, FIG. 3, in the plane wall section 30 of the bearing cover half 21, distributed around the fixture hole 27.

The outer collar 83 of the rubber sleeve 77 is somewhat wider than the inner collar 81. It is initially slightly conical, harmonizing with the conical surface 63 of the reinforcing plate 23, so as thereafter to level out and be closed off by a short, cylindrical flanged section 90. In addition, the plane section of the outer collar 83 is provided with inner and outer slots 91, 92, which are arranged alternately in the same way as the slots 84, 85 in the inner collar 81. The outer collar 83 further has four inward-facing, tubular protuberances 94, which are provided on the outside with a number of longitudinal projections. The pipes continue in the form of holes 95, which extend through the collar 83 close to the outer cylindrical flanged section. The tubular protuberances 94 are placed and dimensioned such that they can be pressed into corresponding holes 96 in the reinforcing plate 23, FIG. 6, which are also distributed around the fixture hole 27.

The plastic inner locking washer 78 has an inner, slightly conical section 97, which corresponds to a corresponding conical section on the outer collar 83 of the rubber sleeve, and outside this conical section 97 a section 98 which is plane on the inside and is provided with four inwardly directed protuberances 100, which are placed and dimensioned such that they can be pressed in through the holes 95 and further into the tubular protuberances 94 on the outer collar 83 of the rubber sleeve 77. In the fitted position, the plastic locking washer 78 comes to lie inserted in the rubber sleeve 77 inside its cylindrical flange 90. On the outside, the plastic inner locking washer 78 has gently rounded cogs 102, which form a ring adjacent to the outer edge of the washer. The cogs 102 thus form a ring, which extends in a wave pattern around the whole of the circumference of the washer 78.

Figure 8:
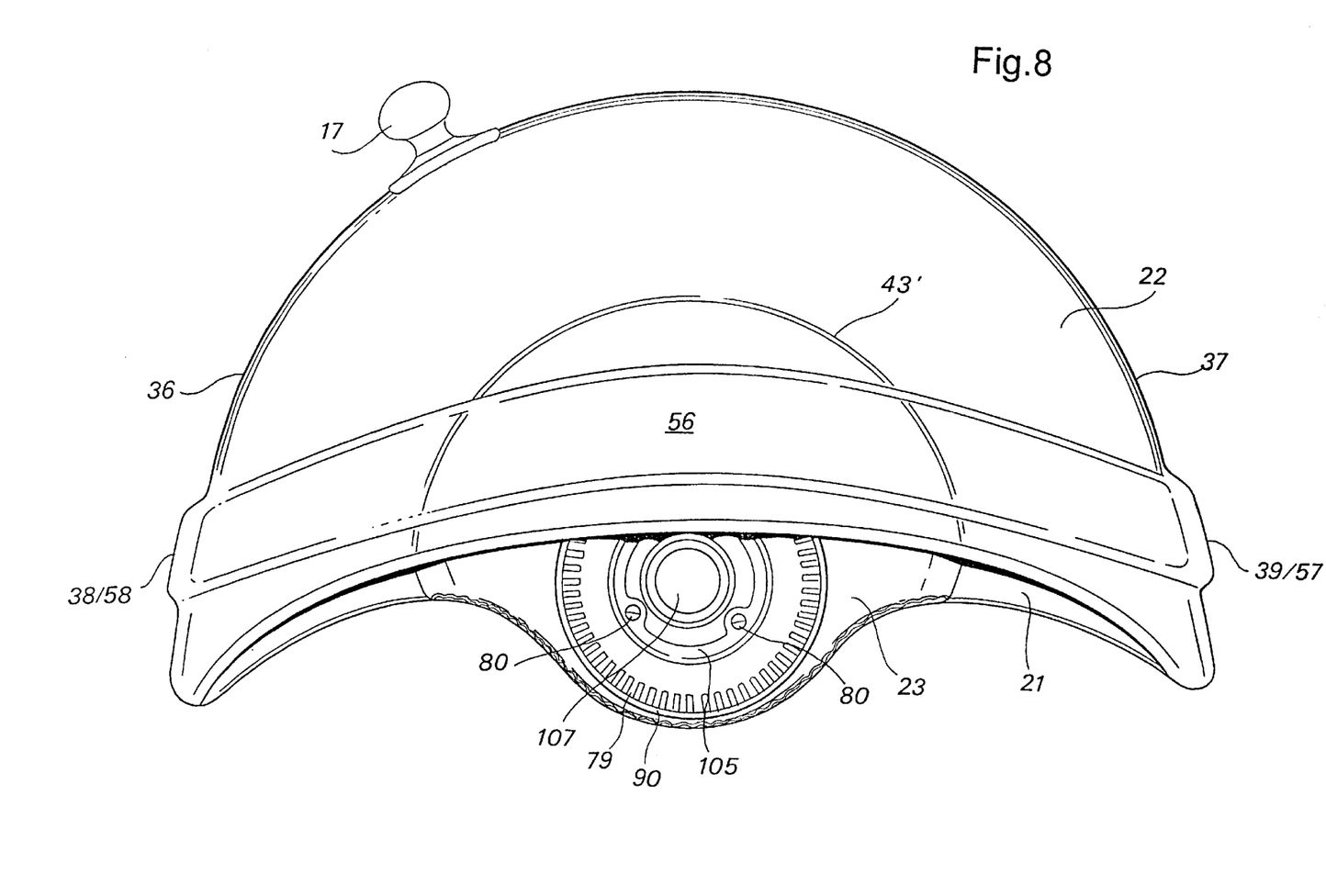
FIG. 8 shows the cover in the same view as in FIG. 4, but supplemented by fixture devices and combined rotational-adjustment and rotation-locking devices.

The steel outer locking washer 79 has along its periphery a corresponding ring in the form of an embossed wave pattern with gently rounded cogs 103 of the same pitch and facing towards and arranged to interact with the cogs 102 on the plastic inner locking washer 78, and the cogs 103 on the steel outer locking washer 79 act as indexing members for desired, graduated adjustment of the splinter shield cover 20 into desired positions, as will be described below. Inside the cog ring thus formed, containing the cogs 103, the steel washer 79 has a conical section 104 harmonizing with the conical section 97 on the plastic inner locking washer 78 and also with corresponding conical sections of the rubber collar 83 and reinforcing plate 23, respectively. Inside its conical section 104, the outer locking washer 79 has a cupped section comprising an annular depression 105 with through holes 106 for the fastening screws 80, inside this depressed section an annular flanged section and a central hole 107 for the axle 10 and for the centring bush 16 of the cutting wheel 6. In the bearing housing 12 there are threaded holes for the fastening screws 80. When the splinter shield is fitted, FIGS. 8 and 2, the outer locking washer 79 bears with its annular section 105 against the bearing housing 12.

Figure 2:
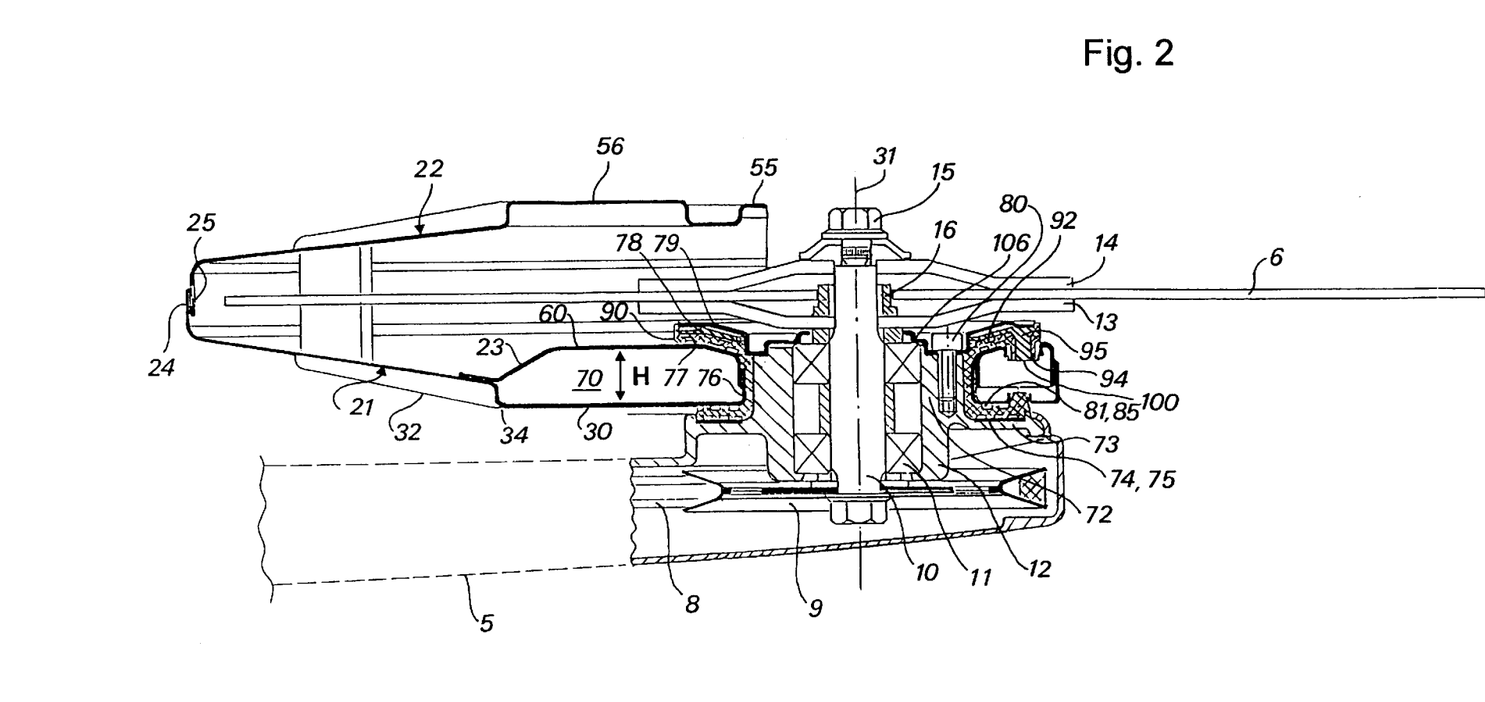
FIG. 2 shows the splinter shield, the cutting wheel and the fixture devices of the splinter shield and cutting wheel along a view II—II in FIG. 1.

When fitting the rotational-adjustment devices and the splinter shield, the procedure is as follows. It is assumed that the cutting wheel 6 and all the other parts which in FIG. 2 are shown fitted on the cutting arm 5 are removed, with the exception of the V-belt 8, belt disc 9, axle 10, bearing 11 and wheel-centring bush 16. It is further assumed that the various parts of the protective cover 20 are joined together and that the cover is otherwise ready for fitting.

The plane plastic washer 75 is placed in the annular slot 74 in the flange 73 on the cutting arm 5. The plastic inner locking washer 78 is joined up with the rubber sleeve 77 by the protuberances 100 being pressed down into the holes 95 and into the tubular protuberances 94 on the rubber collar 83 and so that the bottom side of the washer 78 is brought into contact with the top side of the collar 83. The rubber sleeve 77 is subsequently squeezed firmly onto the protective cover 20 through the fixture hole 27, so that its inner collar 81 comes to bear with its top side against the bottom side of the plane section 30 around the fixture hole 27 and the outer collar 83 comes to bear against the conical surface 63 and against the plane surface 60 of the reinforcing plate 23 around the hole 61, FIG. 6. The rubber sleeve 77 is further dimensioned such that its cylindrical section 82 becomes pressed with its outside against the wall of the fixture hole 27. In addition, the protuberances 87 are brought into the holes 88, FIG. 3, on the plane section 30 of the protective cover and the tubular protuberances 94 on the rubber collar with the protuberances 100 on the inner locking washer 78 are brought into the holes 96 on the reinforcing plate 23, FIG. 6. Alternatively, the rubber collar can be squeezed in through the fixture hole 27 and the protuberances of the rubber collar are brought into the said holes before the inner locking washer 78 is joined up with its protuberances 100 in the rubber collar 83. The steel outer locking washer 79 is subsequently placed in position on the inner locking washer 78 with the cogs 102 and 103 on the two locking washers intermeshed. The next step is to place the protective cover 20 on the cutting arm 5, so that the rubber collar 77 is driven in on the cylindrical section 72 of the bearing housing 12 until the inner rubber collar 81 comes into contact with the plastic washer 75 in the slot 74. Finally, the fixture devices and rotational-adjustment and rotation-locking devices are fixed by means of the screws 80, the box girder construction, which defines the chamber 70, i.e. the double-walled section on the bearing cover half becoming enclosed by the rubber sleeve 77 between the locking washers 78 and 79, on the one hand, and the flanged section 73 of the cutting arm 5, on the other hand, the two rubber collars 81 and 83 acting as resilient shims. Finally, the cutting wheel 6 is fitted on the axle 10 by means of the fastening washers 13, 14 and the nut 15, in a manner which is known per se.

Whilst the machine 1 is in use, vibrations are essentially prevented from occurring in the protective cover 20 or from being transferred to this from the machine. This is achieved through a combined set of special features belonging to the invention. Of great importance in this context is that the cover is double-walled in a circumferential region around the fixture hole and that the distance H between the two walls 30, 60 is substantial. According to the chosen embodiment, it amounts to 15 mm and should generally, in relation to the thickness of the material of the walls, amount to the measures which have been stated above and/or which are specified in the subsequent patent claims. Also of importance is that the said double-walled, circumferential box construction is clamped between resilient and/or flexible members, which, according to the embodiment, are constituted by collars and bellies on the rubber sleeve 77. Finally, the circumferential ridge which has been described above and which is partially integrated with the said box construction acts as a basic stiffening of the cover, significant importance probably being attached, in particular, to the protuberances 38/58 and 39/57 which are integrated with the circumferential ridge.

The screws 80 fix the outer locking washer 79 on the cutting arm 5. The locking washer 79 can therefore not be rotated about the rotation axis 31. As a result of mating between the cogs 102 and 103 on the locking washers 78 and 79, undesirable rotation of the protective cover 20 due to stresses during normal machine operation is prevented. On the other hand, it is possible to rotate the cover about the rotation axis 31 with manual force by pulling on the handle 17 on the cover 20, by virtue of the fact that the cogs 102 and 103 are rounded, thereby permitting priming as one or both of the rubber collars 81, 83 are simultaneously compressed, which rubber collars are provided for this purpose with the said annular slots 91, 92 and 84, 85, respectively. By means of this rotation, the rubber sleeve 77 is rotated with its cylindrical belly 82 about the cylindrical section 72 of the bearing housing 12, at the same time as the inner collar 81 of the rubber sleeve slides against the plastic washer 75 in the slot 74. As a result of the micro-movements which can occur in the cover 20 during machine operation, the cover is further spontaneously fixed in the new position.

The invention is not bound to the shown embodiment. Amongst conceivable modifications relating to the cover, it is important to mention that it can, of course, be made from material other than sheet steel, e.g. aluminium. In this case, it can and should be given greater material thickness. The outer distance between the walls 30, 60 in the double-walled, circumferential section around the fixture hole 27 should also in this case amount to no less than 10 mm, but the inner distance H can in this case be less than when the cover is made from sheet steel. Preferably, the inner distance H between the walls 30, 60 should in this case be no less than 5 mm, preferably in this case no less than 8 mm, expediently no less than 10 mm. It shall also be mentioned that the distance between the walls 30, 60 does not necessarily need to amount to the said measurements within the whole of the double-walled region, but that the said distances must be contained within at least some part of the double-walled region, preferably within that part which is clamped by the fixture devices around the fixture hole 27.

Amongst other conceivable modifications, it is important to mention that the reinforcing plate 23 can be given a different extent from that which is shown. For example, it can extend further out in a lateral direction towards the periphery of the cover within the region for the elevated sections 32, 33. It is also possible for a section of the reinforcing plate 23 to extend up against the crest of the cover 20, so that the reinforcing plate 23 in plan view acquires the principal shape of an upturned and downturned T.

The chamber 70 is normally empty. As a further modification, mention must however be made of the possibility of filling the chamber 70 with foamed plastic, expediently after the cover 20 has been welded together, e.g. through an injection hole on the inside of the cover within the region of the reinforcing plate 23. The aim of such filling would be to increase further the vibration-damping capacity of the chamber 70 with only a marginal increase in the total weight of the protective cover.

Amongst modifications to the fixture and adjustment devices, it is important to mention that the indexing members, i.e., according to the embodiment, washers provided with rounded cogs, can be placed between the clamped cover walls and the tool carrier rather than on the inside of the cover.

We claim:

1. An apparatus for use in an engine-driven machine that includes a tool carrier for a rotary tool, a splinter shield cover that houses a section of the tool and a through-running fixture hole in the cover, the apparatus comprising:

clamping devices on the inside of the side wall of the cover;

first and second locking devices arranged adjacent to the fixture hole and clamped between said clamping devices and the tool carrier under the action of a clamping force acting in the axial direction of the rotary tool;

both of said first and second locking devices each comprising a locking washer that is provided with indexing members, and the indexing members of the first locking device being engageable with the indexing members of the second locking device;

at least one resilient member arranged between the locking devices and the side wall or the tool carrier so as to provide an axial clamping force that resiliently presses the indexing members into engagement with one another;

and the indexing members being shaped to allow the indexing members on the first and second locking devices to slide over each other and hence allow rotation of the cover about the center of rotation of the tool when the cover is exposed to torque as a result of a manual force to the cover for stepwise, indexed adjustment of the cover for the positioning of the cover into desired, indexed rotational positions relative to the tool carrier, and said rotational positions being chosen from amongst a number of indexed rotational positions, defined by the said first and second locking devices, whereby the axial clamping force can be surmounted by compression of said at least one resilient member, and the axial clamping force prevents the cover from rotation about the center of rotation of the tool due to normally occurring stresses while the machine is in use wherein the indexing members comprise cogs that are rounded such that they allow the indexing members on the first and second locking devices to slide over each other and hence allow rotation of the cover when the cover is exposed to torque as a result of the manual force which is applied to the cover for desired adjustment of the cover but prevent rotation of the cover due to normally occurring torque to which the cover is exposed while the machine is in use.

2. Apparatus according to claim 1, wherein one of the locking devices is a metal washer provided with indexing members and the other of the locking devices is a plastic washer provided with corresponding indexing member.

3. Apparatus according to claim 1, wherein the said at least one resilient member comprises a collar portion of a rubber sleeve.

4. An apparatus for use in an engine-driven machine having a tool carrier for carrying a rotary tool and having a splinter shield cover for covering the tool, wherein the cover houses a section of the tool and has a through-running fixture hole in the cover, the apparatus comprising: clamping devices on the inside of the side wall of said cover, and first and second locking devices that comprise first and second locking washers arranged adjacent to the fixture hole, each of said first and second locking washers being provided with indexing members on one side thereof, the indexing members of one of said first and second locking washers interacting with the indexing members on the other of said first and second locking washers, where the locking devices are clamped between said clamping devices and the tool carrier under the action of a clamping force acting in the axial direction of the rotary tool, at least one resilient member being arranged between the locking devices and the side wall or the tool carrier, wherein the said indexing members are so rounded that they allow rotation of the cover about the center of rotation of the tool, such that the cover may be manually adjusted and retained into a plurality of indexed rotational positions relative to the tool carrier, by the compression of said at least one resilient member, but prevented from rotation about the center of rotation of the tool due to normally occurring stresses while the machine is in use;

wherein the said first and second locking devices are arranged on the inside of the side wall and the at least one resilient member comprises a collar portion of a rubber sleeve, the rubber sleeve having an inner collar and an outer collar, with a tubular portion between them, the rubber sleeve extending with said tubular portion through the fixture hole and the two collars extend out over the side wall adjacent to the fixture hole.

5. An apparatus for use in an engine-driven machine having a tool carrier for carrying a rotary tool and having a splinter shield cover for covering the tool, wherein the cover houses a section of the tool and has a through-running fixture hole in the cover, the apparatus comprising: clamping devices on the inside of the side wall of said cover, and first and second locking devices that comprise first and second locking washers arranged adjacent to the fixture hole, each of said first and second locking washers being provided with indexing members on one side thereof, the indexing members of one of said first and second locking washers interacting with the indexing members on the other of said first and second locking washers, where the locking devices are clamped between said clamping devices and the tool carrier under the action of a clamping force acting in the axial direction of the rotary tool, at least one resilient member being arranged between the locking devices and the side wall or the tool carrier, wherein the said indexing members are so rounded that they allow rotation of the cover about the center of rotation of the tool, such that the cover may be manually adjusted and retained into a plurality of indexed rotational positions relative to the tool carrier, by the compression of said at least one resilient member, but prevented from rotation about the center of rotation of the tool due to normally occurring stresses while the machine is in use;

wherein the said first and second locking devices are arranged on the inside of the side wall and the at least one resilient member comprises a collar portion of a rubber sleeve having an inner collar and an outer collar, with a tubular portion between them, the rubber sleeve is fixed to the side wall of the cover and the rubber sleeve extends with said tubular portion through the fixture hole and the two collars extend out over the side wall adjacent to the fixture hole; and wherein at least one of the collars of the rubber sleeve is provided with protuberances or other projections that engage in holes in the side wall, and one of the said first and second locking devices that lies closest to the side wall is also provided with protuberances or other projections, which engage in holes in the side wall, and the protuberances or other projections on the one of the said first and second locking devices which lies closest to the side wall extends through the said at least one resilient member.

6. An apparatus for use in an engine-driven machine having a tool carrier for carrying a rotary tool and having a splinter shield cover for covering the tool, wherein the cover houses a section of the tool and has a through-running fixture hole in the cover, the apparatus comprising: clamping devices on the inside of the side wall of said cover, and first and second locking devices that comprise first and second locking washers arranged adjacent to the fixture hole, each of said first and second locking washers being provided with indexing members on one side thereof, the indexing members of one of said first and second locking washers interacting with the indexing members on the other of said first and second locking washers, where the locking devices are clamped between said clamping devices and the tool carrier under the action of a clamping force acting in the axial direction of the rotary tool, at least one resilient member being arranged between the locking devices and the side wall or the tool carrier, wherein the said indexing members are so rounded that they allow rotation of the cover about the center of rotation of the tool, such that the cover may be manually adjusted and retained into a plurality of indexed rotational positions relative to the tool carrier, by the compression of said at least one resilient member, but prevented from rotation about the center of rotation of the tool due to normally occurring stresses while the machine is in use;

wherein one of the said first and second locking devices that lies closest to the side wall is also provided with protuberances or other projections that engage in holes in the side wall, and wherein the said protuberances or other projections on the one of the said first and second locking devices which lies closest to the side wall extends through the said at least one resilient member.

7. An apparatus for use in an engine-driven machine having a tool carrier for carrying a rotary tool and having a splinter shield cover for covering the tool, wherein the cover houses a section of the tool and has a through-running fixture hole in the cover, the apparatus comprising: clamping devices (80) on the inside of the side wall of said cover, and first and second locking devices which comprise first and second locking washers arranged adjacent to the fixture hole, said first and second locking washers being provided with indexing members in the form of rounded cogs on one side of said locking washers, where the locking devices are clamped between said clamping devices and the tool carrier under the action of a clamping force acting in the axial direction of the rotary tool, at least one resilient member being arranged between the locking devices and the side wall or the tool carrier, the cogs rounded such that they allow the indexing members on the first and second locking devices to slide over each other when the cover is exposed to torque so that the said indexing members are so rounded that allow rotation of the cover about the center of rotation of the tool, such that the cover may be manually adjusted and retained into a plurality of indexed rotational positions relative to the tool carrier, by the compression of said at least one resilient member, but prevented from rotation about the center of rotation of the tool due to normally occurring stresses while the machine is in use.

8. Apparatus according to claim 7, wherein the plurality of indexed rotational positions are spaced so that there is equal graduation between the rotational positions.

9. Apparatus according to claim 7, wherein the first and second locking washers are arranged on the inside of the side wall.

10. Apparatus according to claim 9, wherein the clamping devices and the first locking washer constitute an integrated unit.

11. Apparatus according to claim 9, wherein the first locking washer is non-rotatably connected to the tool carrier, whereas the said second locking washer is non-rotatably connected to the cover and is arranged so as to rotate relative to the tool carrier upon stepwise rotation of the cover to a new indexed rotational position.

12. Apparatus according to claim 9, wherein the said at least one resilient member comprises a collar portion of a rubber sleeve.

13. Apparatus according to claim 12, wherein the rubber sleeve has an inner collar and an outer collar, with a tubular portion between them, and in that the rubber sleeve extends with said tubular portion through the fixture hole, and in that the two collars extend out over the side wall adjacent to the fixture hole.

14. Apparatus according to claim 13, wherein the rubber sleeve is fixed to the side wall of the cover.

15. Apparatus according to claim 14, characterized in that at least one of the collars of the rubber sleeve is provided with protuberances or other projections which engage in holes in the side wall.

16. Apparatus according to claim 15, wherein one of the first and second locking washers that lies closest to the side wall is also provided with protuberances or other projections which engage in holes in the side wall.

17. Apparatus according to claim 16, wherein the protuberances or other projections on the one of the said first and second locking washers that lies closest to the side wall extends through the said at least one resilient member.

18. Apparatus according to claim 7, wherein the first and second locking washers are arranged on the outside of the side wall between the side wall and the tool carrier.

19. Apparatus according to claim 7, wherein one of the locking washers is a metal washer provided with indexing members and the other of the locking washers is a plastic washer provided with corresponding indexing member.

* * * * *